No. 639,165. Patented Dec. 12, 1899.
R. FREYSINGER.
ELASTIC TIRE.
(Application filed June 13, 1899.)

(No Model.)

Witnesses
Robert Emmett
W. B. Keefer

Inventor
Rudolf Freysinger,
By James L. Norris
Atty.

UNITED STATES PATENT OFFICE.

RUDOLF FREYSINGER, OF RIGA-SASSENHOF, RUSSIA.

ELASTIC TIRE.

SPECIFICATION forming part of Letters Patent No. 639,165, dated December 12, 1899.

Application filed June 13, 1899. Serial No. 720,396. (No model.)

*To all whom it may concern:*

Be it known that I, RUDOLF FREYSINGER, manufacturer, of Riga-Sassenhof, in the Empire of Russia, have invented a new and useful Improvement in Elastic Tires and in Wheels for Use Therewith; and I do hereby declare the nature of this invention and in what manner the same is to be performed to be particularly described and ascertained in and by the following statement, reference being had to the accompanying drawings and to the letters marked thereon.

Elastic tires as at present used have nearly all the defect of being under a tensional strain of from seven to nine per cent. when mounted upon the wheel-rims—that is to say, they are on the average smaller than the wheel-rims, and must therefore be stretched in order to be got into position. If such a tire be injured when in use—as, for instance, by cutting—the cut gradually enlarges of itself owing to the tension of the rubber. Moreover, in the base of such tires iron studs or pins are inserted transversely at regular distances apart to lock or join against the inwardly-bent edges of the wheel-rim, thus securely retaining the tire on the said rim. The mounting or fixing operation is consequently very difficult, as the iron pins have each to be brought into an oblique position by pressure and the tire has then to be forced into the rim. Removal of the tire, on the other hand, is almost impossible without injuring it. Owing to the edges of the rim being bent inward, the rubber at the corresponding place is firmly compressed, and owing to the friction and compression set up during riding the rubber very soon becomes defective. All these defects are entirely obviated by my improved tire, the mounting or fixing and the removal of which can be very easily effected by any one. The rubber is neither subject to tension nor to compression. Consequently it will never tear, but must wear quite evenly and very gradually. Moreover, by using the improved rubber tire riding is much smoother and more elastic than by using ordinary tires, and the tire, owing to its conical shape, has the great advantage that it does not throw the mud sidewise.

My improved tire is represented by way of example in the accompanying drawings.

Figure 1:
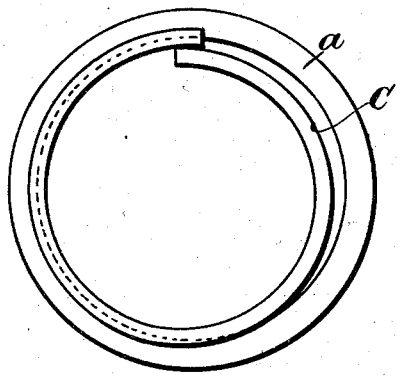
Figure 2:
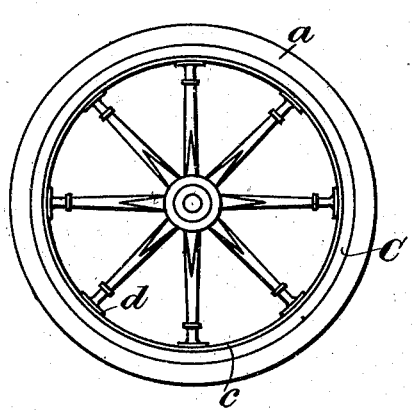
Figure 3:
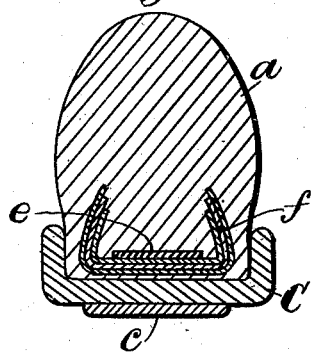
Figure 4:
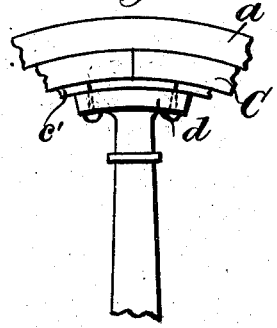

Figure 1 shows the elastic tire in side elevation on a rim that is shown in collapsed condition or reduced in diameter to facilitate attachment and removal of the tire. Fig. 2 is a side elevation of the tire and rim attached to a wheel. Fig. 3 is an enlarged cross-section of the tire and rim. Fig. 4 is a detail view of a portion of the tire and rim and one attached wheel-spoke.

Into the base of the tire $a$, Fig. 3, which is of approximately triangular cross-section, a closed band or ring $e$, of steel, is inserted and is firmly secured in position in the rubber by strips of canvas $f$. As the tire cannot be stretched, it is necessary in order that it may be put in place to employ a rim either capable of being opened laterally or the periphery of which can be reduced. A rim of the latter kind is shown in Fig. 1 and is constructed as follows: A flexible rim $b$ of V shape in cross-section, having a groove which fits the rubber tire $a$, is cut through at one place, so that the two ends, as shown in Fig. 1, can be slid over one another. The periphery of this rim can be thus reduced, so that in this state the tire can be passed over its edges into its groove. The rim is then returned to its former true circular state—that is to say, its ends are made to meet or abut. Thus the tire is mounted in an absolutely reliable manner without any tension upon the iron or metal rim, and separation of the rubber from the rim, owing to its elastic nature, is quite impossible, because the circumference of the steel band $e$ is smaller than that of the outer edge of the V-shaped iron rim $b$.

In order to secure the cut part or joint of the rim $b$, a closed wedging or filling ring $c$ is inserted in the rim, as shown in Fig. 2, and firmly secured thereto by screws, rivets, or otherwise. The ring $c$ carries spoke-sockets $d$, in which terminate the spokes of the wheel. Now in order to fix or to remove a tire all that is necessary is to separate the two rings $b$ and $c$, the latter remaining firmly connected to the spokes of the wheel. Thus fixing can be effected easily and rapidly. The wedging or filling ring $c$ is not, however, absolutely necessary, as the spoke-sockets $d$ may be fastened direct to the ring $b$, and the cut or joint may be closed by fixing over the same a metal plate or a spoke-socket $d$.

Fig. 3 represents a vertical cross-section through the rubber tire, the rim b, and the ring c, while Fig. 4 shows the application of a plate c' instead of the wedging or filling ring c.

Having now particularly described and ascertained the nature of my said invention and in what manner the same is to be performed, I declare that what I claim is—

The combination with an elastic tire a having a metal ring e embedded therein, of the collapsible wheel-rim b, and the wedging or filling ring c provided with spokes, substantially as described.

In witness whereof I have hereunto set my hand in presence of two witnesses.

RUDOLF FREYSINGER.

Witnesses:
PAUL ENBERG,
ARTHUR BULLE.